(12) United States Patent
Yang et al.

(10) Patent No.: US 9,727,237 B2
(45) Date of Patent: Aug. 8, 2017

(54) MANAGEMENT METHOD AND MANAGEMENT SYSTEM OF KEYPAD OF HANDHELD ELECTRONIC DEVICE

(71) Applicant: Chiun Mai Communication Systems, Inc., New Taipei (TW)

(72) Inventors: Cheng-Kuo Yang, New Taipei (TW); Chien-Liang Liao, New Taipei (TW); Yueh-Chi Wang, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 51 days.

(21) Appl. No.: 14/522,003

(22) Filed: Oct. 23, 2014

(65) Prior Publication Data

US 2015/0186040 A1 Jul. 2, 2015

(30) Foreign Application Priority Data

Dec. 27, 2013 (CN) .......................... 2013 1 0734607

(51) Int. Cl.
*G06F 3/0488* (2013.01)
*H04M 1/725* (2006.01)
*H04M 1/02* (2006.01)

(52) U.S. Cl.
CPC .... *G06F 3/04886* (2013.01); *H04M 1/72519* (2013.01); *H04M 1/0281* (2013.01); *H04M 2250/22* (2013.01)

(58) Field of Classification Search
CPC .. G06F 3/04886; G06F 3/0237; G06F 3/0238; G06F 3/0488; G06F 3/0418; G06F 1/1624; G06F 3/0481; G06F 3/0489; G06F 17/273; G06F 17/276; G06F 17/28; G06F 17/289; G06F 17/277; G06F 1/169; G06F 3/0485
See application file for complete search history.

(56) References Cited

U.S. PATENT DOCUMENTS

2008/0318635 A1* 12/2008 Yoon .................... G06F 1/1624
                                                        455/566
2009/0160776 A1*  6/2009 Tsai .................... G06F 3/0202
                                                        345/169
2011/0078614 A1*  3/2011 Lee .................... G06F 3/04886
                                                        715/773
2011/0234524 A1*  9/2011 Longe .................. G06F 3/0237
                                                        345/173

(Continued)

*Primary Examiner* — Nalini Mummalaneni
*Assistant Examiner* — Robert Michaud
(74) *Attorney, Agent, or Firm* — Steven Reiss

(57) ABSTRACT

A method of managing a keypad of a handheld electronic device comprises promoting a user whether a size of the keypad needs adjustment when the handheld electronic device is in a single hand operating mode. If the answer is yes, the handheld electronic device then detects a movement of a finger of the user on a touch screen thereof. When a movement of the finger along a diagonal direction of the keypad away from the keypad is detected, the size of the keypad is increased. When a movement of the finger alone the diagonal direction of the keypad toward the keypad is detected, the size of the keypad is decreased. When the movement of the finger is stopped and a "Done" button is pressed, the adjustment of the size of the keypad is completed, and the size of the keypad after adjustment is stored in a storage module.

15 Claims, 5 Drawing Sheets

(56) References Cited

U.S. PATENT DOCUMENTS

| | | | | |
|---|---|---|---|---|
| 2012/0075194 A1* | 3/2012 | Ferren | ............... | G02B 13/0065 |
| | | | | 345/168 |
| 2012/0127206 A1* | 5/2012 | Thompson | .............. | G06F 3/038 |
| | | | | 345/661 |
| 2015/0046148 A1* | 2/2015 | Oh | ................... | H04N 5/44591 |
| | | | | 704/3 |

* cited by examiner

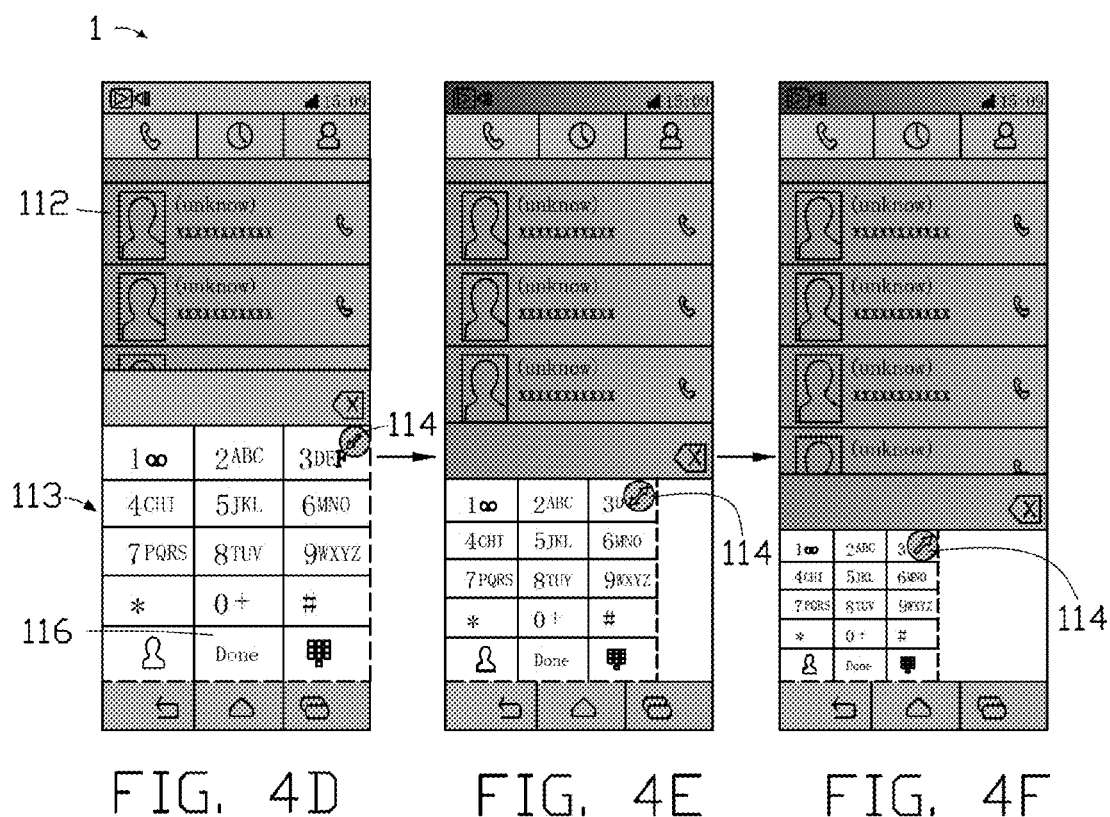

MANAGEMENT METHOD AND MANAGEMENT SYSTEM OF KEYPAD OF HANDHELD ELECTRONIC DEVICE

FIELD

The present disclosure relates to a management method and a management system of a user interface of a handheld electronic device, and, more particularly to a management method and a management system of a keypad, particularly a dial pad, of a smart phone.

BACKGROUND

A trend of a handheld electronic device such as a smart phone is that its touch screen is getting larger and larger, whereby a keypad, particularly a dial pad, thereof can be getting larger and larger. To enable a user to conveniently operate the keypad, a single hand-operated keypad is equipped whereby the user can input information into the handheld electronic device. The single hand-operated keypad is a reduced version of the normal keypad and located selectively near one of two lateral sides of the handheld electronic device when it is shown on the touch screen.

Such a single hand-operated keypad in some measure can help the user to operate the handheld electronic device more conveniently. Nevertheless, a size of the single hand-operated keypad is fixed, whereby its usefulness is limited. The single hand-operated keypad cannot be adapted to different users having different palm sizes.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the present management method and system for keypad of handheld electronic device. Moreover, in the drawings, like reference numerals designate corresponding parts throughout the several views.

FIGS. 4A-4F show different views illustrating size adjustments of the keypad of the handheld electronic device of FIG. 1.

DETAILED DESCRIPTION

Figure 1:
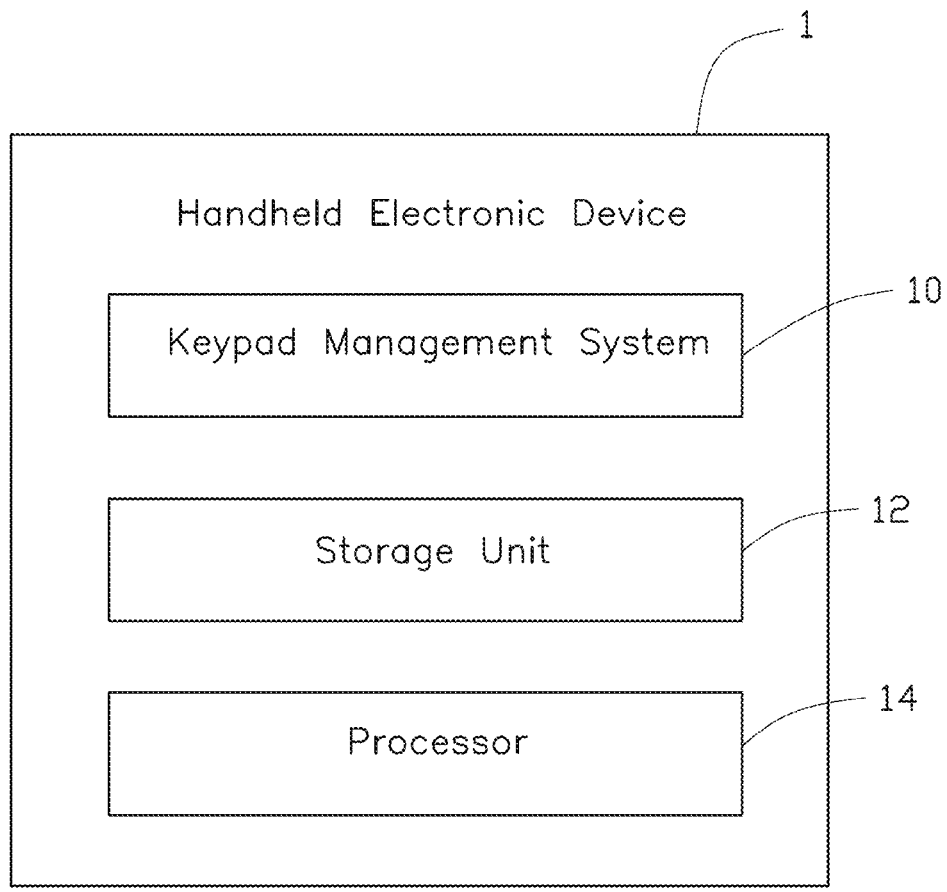
FIG. 1 is a block diagram showing a handheld electronic device having a keypad management system in accordance with the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "module" refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising," when utilized, means "including, but not necessarily limited to"; it specifically indicates open-ended inclusion or membership in the so-described combination, group, series and the like.

Referring to FIG. 1, a handheld electronic device 1 in accordance with the present disclosure includes at least a keypad management system 10, a storage unit 12 such as a memory or a hard disc drive and a processor 14 which is for example a micro processor. The storage unit 12 is used to storage programs and data of the keypad management system 10. The handheld electronic device 1 can be, but not limited to, a tablet computer, a mobile phone such as a smart phone, or a personal digital assistant (PDA). In the disclosed embodiment, the keypad management system 10 manages a dial pad shown on a touch panel of the handheld device 1; however, it can be understood that the keypad management system 10 can also manage a QWERTY keypad shown on the touch panel of the handheld electronic device 1.

The keypad management system 10 enables a keypad of the handheld electronic device 1 to be used by a single hand of a user, either right hand or left hand. A size of the keypad is reduced whereby the user can conveniently input information into the handheld device 1 by using a user's hands. At the left-hand mode, the reduced keypad is first shown on a left side of the touch panel; then a size of the reduced keypad can be adjusted to be expanded or further reduced to fit a palm size of the left hand of the user. At the right-hand mode, the reduced keypad is first shown on a right side of the touch panel; then the size of the reduced touch panel can be increased or further reduced to fit a palm size of the right hand of the user.

Figure 2:
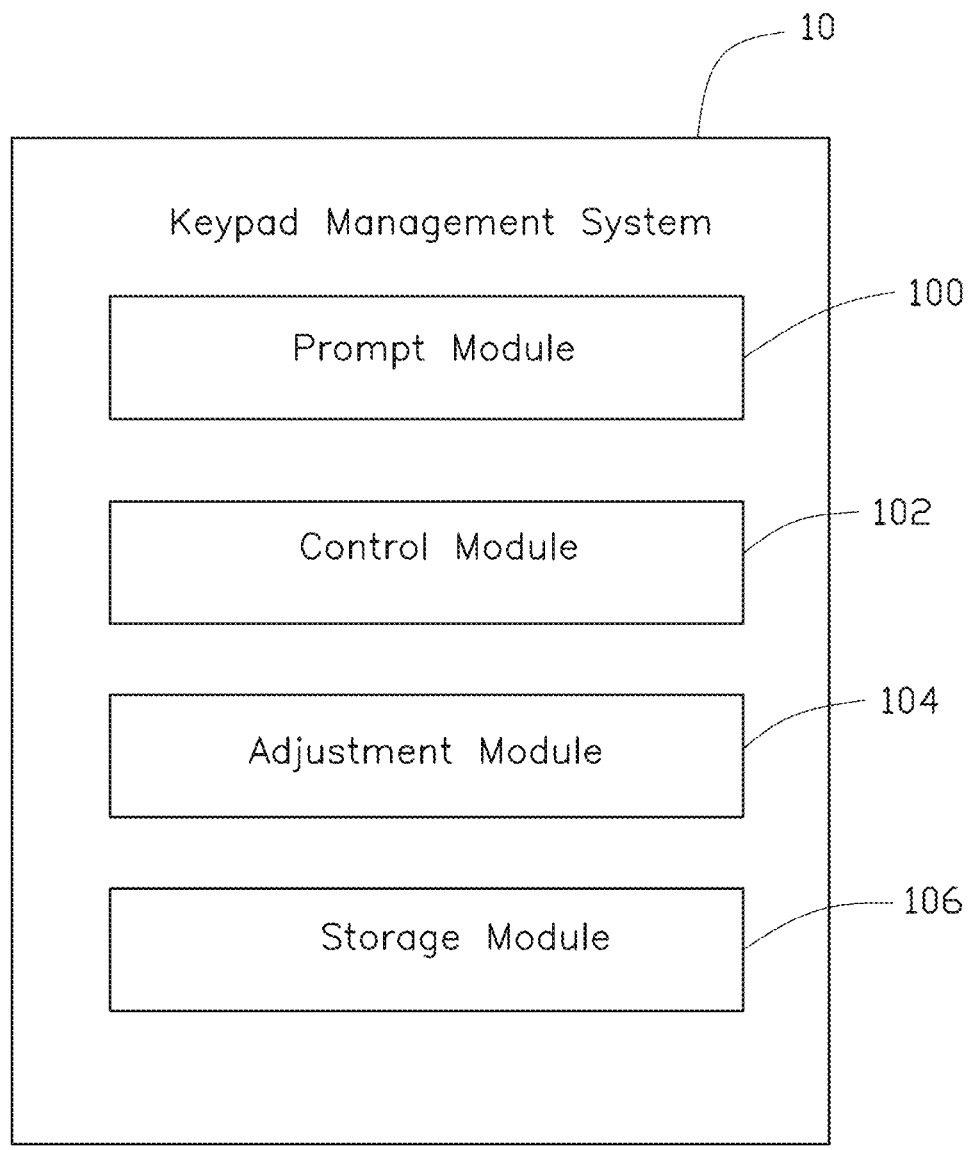
FIG. 2 is block diagram showing constituting modules of the keypad management system of the handheld electronic device of FIG. 1.

Referring to FIG. 2, the keypad management system 10 includes a prompt module 100, a control module 102, an adjustment module 104 and a storage module 106, which are executed by the processor 14 when needed. Functions of each of the prompt, control, adjustment and storage modules 100, 102, 104, 106 can be referred to descriptions of FIG. 3.

Figure 3:
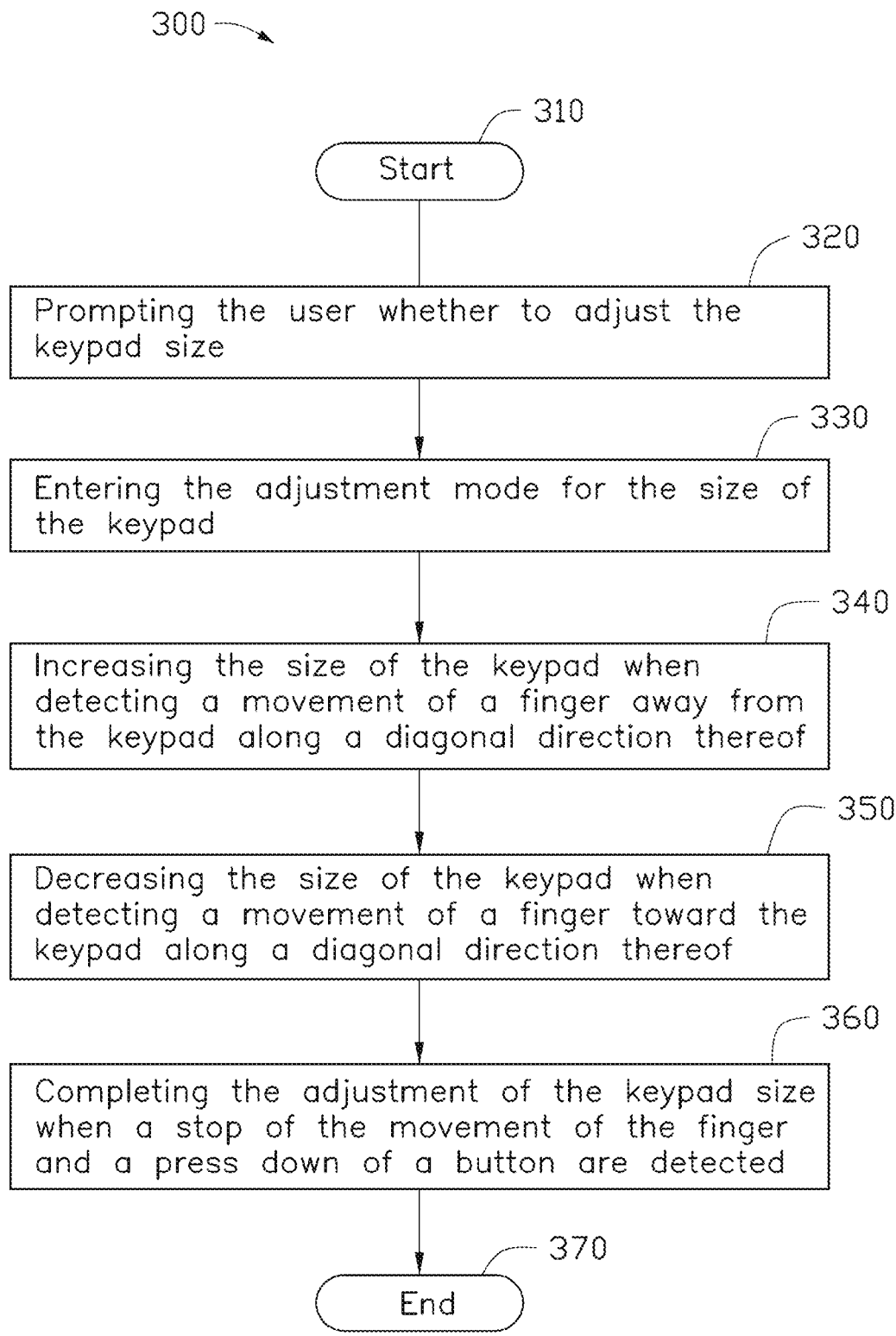
FIG. 3 is a flowchart showing a management method of a keypad of the handheld electronic device of FIG. 1.

Also referring to FIG. 3, a keypad management method 300 of the present disclosure is shown, which starts from block 310 after the handheld electric device 1 has entered a single hand operating mode for keypad. In block 320, the prompt module 100 prompts the user whether he or she wants to adjust a size of the keypad in the single operating mode. Such a prompt can be achieved by using a prompt window. If the answer is yes, then the method 300 moves to block 330. If no, the method 300 is ended.

In block 330, the control module 102 receives commands from the user that wants to adjust the size of the keypad. The control module 102 then has the keypad of the handheld electronic device 1 enter an adjustment mode and begins to detect a movement of a finger of the user on the keypad which is shown on a touch panel of the handheld electronic device 1. Also, referring to FIGS. 4A-4C, a keypad 113 is shown on a touch panel 112 of the handheld electronic device 1. The keypad 113 has a substantially rectangular shape. When the control module 102 detects that the finger presses an arrow label 114 on a button of the keypad 113 which is located at an upper, left corner of the keypad 113 and is moved from the corner of the keypad 113 away from the keypad 113 along a diagonal direction of the keypad 113, a size of the keypad 113 is gradually increased by the adjustment module 104 as shown by arrows between FIGS. 4A-4C. The size of the keypad 113 is adjustable within a predetermined range which is controlled by the adjustment module 104. According to the present disclosure, there are upper limit and lower limit of the size (i.e., area) of the keypad 113. When the keypad 113 is a dial pad as shown in FIGS. 4A-4E, the upper limit of the size of the keypad 113 is 12 cm$^2$ and the lower limit is 2 cm$^2$. The upper and lower limits are obtained according the actual users' experiences in dialing the dial pad 113, wherein the range of size of the dial pad 113 enables an ordinary user to use the keypad 113 without undue difficulty. In block 330, the adjustment module 104 increases the size of the dial pad 113 to an extent that the user thinks convenient for his or her palm to operate. The size of the dial pad 113 nevertheless cannot be increased to exceed 12 cm$^2$.

Also referring to FIGS. 4D-4F, in block 340, when the control module 102 detects that the finger of the user presses the arrow label 114 on a button at an upper, right corner of the keypad 113 and is moved from the corner of the keypad 113 inward toward a center of the keypad 113 alone a diagonal direction thereof, the size of the keypad 113 is gradually decreased by the adjustment module 102 as shown by arrows between FIGS. 4D-4F. The size of the dial pad 113 cannot be decreased to be less than 2 cm$^2$.

At block 350, when the control module 102 detects that the finger has stopped its movement (e.g. dragging) on the touch panel 112, and a button "Done" 116 which is shown in FIGS. 4A-4E has been pressed, the storage module 106 stores the present keypad 113 having the adjusted size therein. Thereafter, the keypad management method is ended at block 360 whereby the mode of the handheld electronic device 1 for adjusting the size of the keypad 113 is ended.

According to the present disclosure, when the size of the keypad 113 is equal to or larger than the upper size limit, the size of the keypad 113 cannot be increased by the adjustment module 104. Only decrease of the size of the keypad 113 can be performed. Alternatively, when the size of the keypad 113 is equal to or smaller than the lower limit, the size of the keypad 113 cannot be decreased by the adjustment module 104. Only increases of the size of the keypad 113 can be performed.

Figures 4A, 4B, 4C:
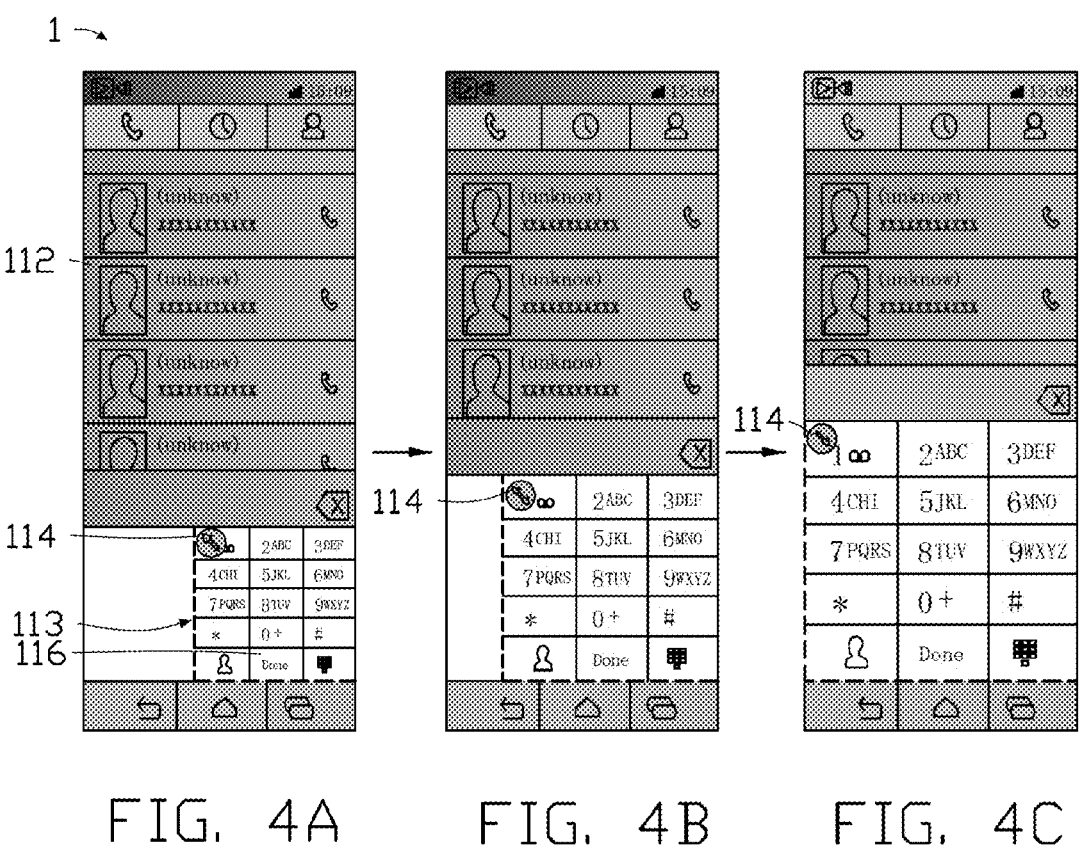

As shown in FIG. 4A, when the keypad size is equal to its lower limit, the arrow label 114 is unidirectional, indicating that the size can be increased only. In FIG. 4B, when the keypad size is adjusted to be between the upper and lower limits, the arrow label 114 is bidirectional, indicating that the size can be increased or decreased. Finally, as shown in FIG. 4C, when the keypad size reaches its upper limit, the arrow label 114 is unidirectional again but opposite to what shown in FIG. 4A, indicating that the size can be decreased only. The arrow label in FIG. 4D indicates that the size can be decreased only. FIG. 4E indicates that the size can be increased or decreased, and in FIG. 4F indicates that the size can be increased only.

Furthermore, when in the adjustment mode of the size of the keypad 113, only the button with the arrow label 114 for adjusting the size of the keypad 113 and the "Done" button 116 can be activated. Other buttons on the touch panel 112 of the handheld electronic device 1 are disabled.

During the adjustment of the size of the keypad 113, two sides of a boundary of the keypad 113 are shown in dashed lines to enable the user to easily perceive the location of the concerned sides of the boundary and accordingly the size of the keypad 113. Thus, the user can more easily decide whether the size of the keypad 113 is suitable for his or her need.

Finally, the keypad 113 of the present disclosure can be easily shifted between right-hand keypad (FIGS. 4A-4C) and left-hand keypad (FIGS. 4D-4E) by having the finger of the user swipe the touch panel 112 rightward or leftward when the handheld electronic device 1 is in the adjustment mode of the size of the keypad 113.

It is to be understood that the above-described embodiments are intended to illustrate rather than limit the disclosure. Variations may be made to the embodiments without departing from the spirit of the disclosure as claimed. The above-described embodiments illustrate the scope of the disclosure but do not restrict the scope of the disclosure.

What is claimed is:

1. A handheld electronic device comprising:
    a management system;
    a storage unit for storing data and programs of the management system; and
    a processor; wherein when the handheld electronic device is in a single hand operating mode for a user interface of the handheld electronic device, a size of the user interface is adjustable by the management system under an execution of the processor;
    wherein when a movement on a touch panel of the handheld electronic device starting from a corner of the user interface along a predetermined direction is detected, the size of the user interface is decreased or increased from a first size to a second size, and the entire user interface is shown on the touch panel at both of the first size and the second size;
    wherein when the size of the user interface is equal to a lower limit or an upper limit, a unidirectional arrow label is shown on the touch panel to indicate that the size can be only increased or only decreased, when the size of the user interface is adjusted to be between the upper and lower limits, a bidirectional arrow label is shown on the touch panel to indicate that the size of the user interface can be both increased and decreased.

2. The handheld electronic device of claim 1, wherein the user interface is a dial pad.

3. The handheld electronic device of claim 2, wherein a size of the dial pad is adjustable within a range between 2 cm$^2$ and 12 cm$^2$.

4. The handheld electronic device of claim 1, wherein the management system comprises a prompt module, a control module, an adjustment module and a storage module.

5. The handheld electronic device of claim 4, wherein the prompt module prompts a user of the handheld electronic device whether a size of the user interface in the single hand operating mode is to be adjusted.

6. The handheld electronic device of claim 5, wherein the adjustment module controls a range within which the size of the user interface is adjustable.

7. The handheld electronic device of claim 6, wherein the adjustment module adjusts the size of the user interface when receives commands from the control unit.

8. The handheld electronic device of claim 7, wherein the storage module stores the size of the user interface therein after the adjustment of the size of the user interface.

9. The method of claim 4, wherein when a stop of the movement and a press of a button are detected, a decreasing adjustment of the size of the user interface or an increased adjustment of the size of the user interface is finished and the size of the user interface after the adjustment is stored in the storage module.

10. A method for managing a user interface of a handheld electronic device, comprising:
   prompting a user of the handheld electronic device whether a size of the user interface needs adjustment when the handheld electronic device is in a single hand operating mode;
   detecting a movement on a touch panel of the handheld electronic device to decide one of an increase and a decrease of the size of the user interface after the user decides to adjust the size of the user interface;
   when a movement on the touch panel starting from a corner of the user interface along a predetermined direction is detected, increasing or decreasing the size of the user interface from a first size to a second size, wherein the entire user interface is shown on the touch panel at both of the first size and the second size;
   showing a unidirectional arrow label on the touch panel to indicate that the size of the user interface can be only increased or only decreased, when the size of the user interface is equal to a lower limit or an upper limit; and
   showing a bidirectional arrow label on the touch panel to indicate that the size of the user interface can be both increased and decreased when the size of the user interface is adjusted to be between the upper and lower limits.

11. The method of claim 10, wherein when a movement on the touch panel along a diagonal direction of the user interface away from the user interface is detected, an increase of the size of the user interface is executed.

12. The method of claim 10, wherein when a movement on the touch panel along a diagonal direction of the user interface toward the user interface is detected, a decrease of the size of the user interface is executed.

13. The method of claim 10, wherein the increase of the size of the user interface has an upper limit and the decrease of the size of the user interface has a lower limit.

14. The method of claim 13, wherein the upper limit is 12 $cm^2$, and the lower limit is 2 $cm^2$, the user interface is a keypad and the keypad is a dial pad.

15. The method of claim 10 further comprising a step that when a stop of the movement and a press of a button are detected, the adjustment of the size of the user interface is finished and the size of the user interface after adjustment is stored in a storage module.

* * * * *